May 30, 1961 N. L. WISEMAN ET AL 2,986,655

VARIABLE LEVEL GATING CIRCUIT

Filed April 14, 1958

INVENTORS
NEIL L. WISEMAN
CLYDE W. BAXTER
BY Richard G. Stahr
ATTORNEY

United States Patent Office 2,986,655

Patented May 30, 1961

2,986,655

VARIABLE LEVEL GATING CIRCUIT

Neil L. Wiseman and Clyde W. Baxter, Rochester, N.Y., assignors to General Dynamics Corporation, Rochester, N.Y., a corporation of Delaware Filed Apr. 14, 1958, Ser. No. 728,183

6 Claims. (Cl. 307—88.5)

This invention relates to electronic gating circuits and, more specifically, to variable level electronic gating circuits.

Gating circuits may be generally described as those circuits which produce a new signal in response to the coincident application of two or more other signals and may be classified as dipolar and unipolar.

Prior art gating circuits generally require the coincident application of two or more signals emanating from separate signal sources. For proper operation, the amplitude of these signals must generally remain relatively constant in accordance with the design values of the associated circuit parameters.

However, certain applications may require that the two or more coincident signals be obtained from the same input signal and that an output pulse be produced upon the satisfaction of a selected polarity relationship therebetween and independent of the input signal amplitude.

Without intending or inferring that this invention be limited thereto, one specific example of this requirement is in binary data transmission applications in which it is necessary to reconstruct the transmitted square waveform signal after it has been received over a line which has poor high frequency characteristics and low frequency phase distortion.

It is, therefore, an object of this invention to provide an improved gating circuit.

It is another object of this invention to provide a variable level gating circuit.

It is another object of this invention to provide a variable level gating circuit which derives two or more coincident signals from the same signal source and produces an output signal only upon the satisfaction of a selected polarity relationship therebetween and independent of signal magnitude.

In accordance with this invention, the direct current component of the incoming signal is averaged in an averaging circuit and is coincidentally applied with the input signal to the input electrodes, respectively, of a transistor device. During the time that a selected polarity relationship between these two coincident signals is satisfied, the transistor device is thereby biased to conduction, producing a substantially square waveform signal in the output thereof.

Figure 1:
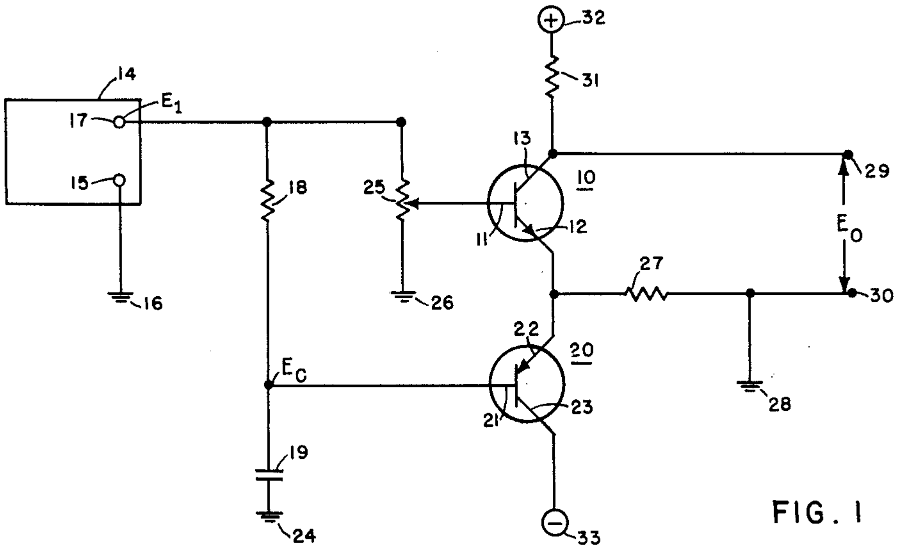
Figure 2:
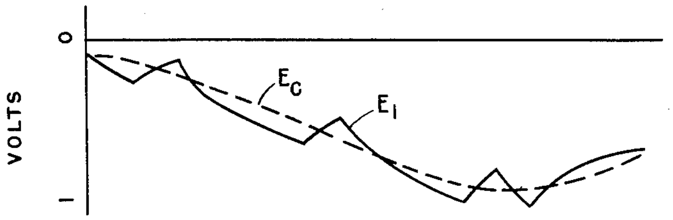
Figure 3:
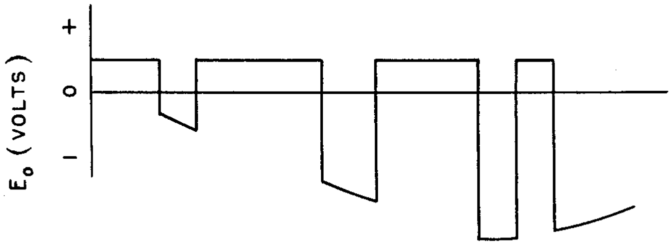

For a better understanding of the present invention, together with further objects, advantages and features thereof, reference is made to the following description and accompanying drawings, in which:

Figure 1 illustrates a preferred embodiment of this invention;

Figure 2 graphically illustrates the two coincident signals which may be used with the circuit of Figure 1; and, Figure 3 graphically illustrates the output signal of the circuit of Figure 1.

A source of input signals, the details of which are well known in the art and form no part of this invention, is illustrated in block form at 14. One terminal 15 of source 14 is connected to point-of-reference potential 16, as indicated.

So that the direct current potential component of the input signal may be averaged, the proper circuitry consisting of the series combination of resistor 18 and capacitor 19 is provided. This averaging circuit is designed to have a time constant of the required value to provide a charge upon capacitor 19 which is the average of the direct current component potential of the input signal potential. This circuit is connected between terminal 17 of source 14 and point-of-reference potential 24, as shown.

A transistor device having the usual base electrode 11, input or emitter electrode 12 and output or collector electrode 13 is indicated by its accepted schematic symbol at 10. The peak-to-peak input signal potential emanating from source 14 is applied to the common or base electrode 11 of transistor 10 through potentiometer 25. The direct current component average potential is taken across capacitor 19 and is applied to the emitter 12 of transistor 10, coincident with the input signal, through an emitter follower circuit comprised of transistor 20 and its associated circuitry. The emitter follower circuit is necessary to provide an extremely high impedance across capacitor 19 so that the potential on capacitor 19 may be used with a minimum disturbance thereto.

Referring now to Figure 2, the input signal potential is indicated by the solid line labeled $E_1$. The average of the direct current component potential of the input signal is indicated by the dashed line labeled $E_c$. Conduction through transistor 10 occurs only during the time that the input signal potential $E_1$ is more positive than the direct current component average potential, as indicated, in that during these periods only is the base-emitter bias requirements of an NPN transistor satisfied. It should be noted that conduction will occur at all times when $E_1$ is more positive than $E_c$, independent of the relative magnitudes.

While transistor 10 is non-conducting, the potential of its collector 13 is positive and substantially equal to the magnitude of the positive voltage source indicated at 32. The output voltage, $E_o$, appearing across output terminals 29 and 30 during these non-conductive periods is, of course, positive-going and of the same magnitude as is indicated in the upper portion of Figure 3. As transistor 10 is biased to conduction during the periods which $E_1$ is more positive than $E_c$, transistor 10 saturates immediately and its emitter potential follows the potential of $E_c$, producing negative-going pulses in output voltage $E_o$ across output terminals 29 and 30 as indicated in Figure 3.

The output signal appearing across output terminals 29 and 30 may be impressed upon a conventional circuit, well known in the art, which will clip off the negative extremes of the output signal, thereby resulting in a substantially square waveform.

While a single embodiment of this invention has been shown and described, it is obvious to those skilled in the art that the selected polarity relationship between $E_1$ and $E_c$ to produce conduction in transistor 10 may be reversed through the use of a PNP transistor and, of course, a reversal of supply voltage polarities.

While a preferred embodiment of this invention has been shown and described, it will be obvious to those skilled in the art that various modifications and substitutions may be made without departing from the spirit of this invention which is to be limited only within the scope of the appended claims.

What is claimed is:

1. A device responsive to a variable amplitude input signal applied thereto, said device comprising first means including integrating means having said input signal applied thereto for producing therefrom a first derived signal having a magnitude equal to the average amplitude of said input signal, second means having said input signal applied thereto for producing therefrom a second derived signal having an instantaneous amplitude equal to a given fraction of the instantaneous amplitude of said input signal, and polarity-sensitive clipping means coupled to said first and second means for producing an output signal having a given polarity in response to the instantaneous amplitude of said second derived signal having a first polarity with respect to the magnitude of said first derived signal and having a polarity opposite to said given polarity in response to the instantaneous amplitude of said second derived signal having a polarity opposite to said first polarity with respect to the magnitude of said first derived signal.

2. The device defined in claim 1, wherein said second means includes third means for adjusting said given fraction.

3. The device defined in claim 1, wherein said integrating means includes a serially-connected resistance and capacitance, said capacitance having one end thereof connected to a point of fixed potential, said input signal being applied to the other end of said capacitance through said resistance, and wherein said first means further includes an emitter follower, said other end of said capacitance being connected to the input of said emitter follower and said first derived signal being produced at the output of said emitter follower.

4. The device defined in claim 3, wherein said polarity-sensitive clipping means includes switching means having first and second inputs and an output, said switching means having a low impedance conducting state and a nonconducting state, said switching means assuming one of its states in response to one of its inputs having said first polarity with respect to the other of its inputs and assuming the other of its states in response to said one of its inputs having a polarity opposite to said first polarity with respect to the other of its inputs, and a load resistance connecting the output of said switching means to a point of fixed potential, and means for applying said second derived signal to said one of said inputs and said second derived signal to the other of said inputs of said switching means.

5. The device defined in claim 4, wherein said switching means is a transistor having base, emitter and collector electrodes, said base being said one input of said switching means, said emitter being said other input of said switching means, and said collector being said output of said switching means.

6. The device defined in claim 4, wherein said second means includes a potentiometer having one end thereof connected to a point of reference potential, the other end thereof having said input signal applied thereto, and a movable wiper from which said second derived signal is produced.

References Cited in the file of this patent

UNITED STATES PATENTS

| | | |
|---|---|---|
| 2,430,315 | Varnum | Nov. 4, 1947 |
| 2,462,897 | Rector | Mar. 1, 1949 |
| 2,466,705 | Hoeppner | Apr. 12, 1949 |
| 2,695,992 | Winger et al. | Nov. 30, 1954 |
| 2,831,983 | Ostendorf | Apr. 22, 1958 |
| 2,834,883 | Lukoff | May 13, 1958 |